US009293904B2

(12) United States Patent
Suzuki

(10) Patent No.: US 9,293,904 B2
(45) Date of Patent: Mar. 22, 2016

(54) ELECTRIC WIRE DRAWOUT PART STRUCTURE

(71) Applicant: Yazaki Corporation, Minato-ku, Tokyo (JP)

(72) Inventor: Hiroyuki Suzuki, Makinohara (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 14/489,624

(22) Filed: Sep. 18, 2014

(65) Prior Publication Data

US 2015/0000971 A1 Jan. 1, 2015

Related U.S. Application Data

(63) Continuation of application No. PCT/JP2013/058461, filed on Mar. 15, 2013.

(30) Foreign Application Priority Data

Mar. 21, 2012 (JP) ................................. 2012-063043

(51) Int. Cl.
*H02G 3/18* (2006.01)
*H01R 13/506* (2006.01)
*H01R 13/516* (2006.01)
*H02G 3/04* (2006.01)
*H02G 3/08* (2006.01)

(52) U.S. Cl.
CPC ............... *H02G 3/18* (2013.01); *H01R 13/506* (2013.01); *H01R 13/516* (2013.01); *H02G 3/0462* (2013.01); *H02G 3/081* (2013.01); *H02G 3/083* (2013.01)

(58) Field of Classification Search
CPC ..................................................... H01R 13/506
See application file for complete search history.

(56) References Cited

U.S. PATENT DOCUMENTS

| | | | | |
|---|---|---|---|---|
| 4,153,326 A | * | 5/1979 | Frantz | H01R 13/28 439/293 |
| 5,219,304 A | * | 6/1993 | Lin | H01R 13/59 439/461 |
| 5,603,642 A | | 2/1997 | Shinji et al. | |

(Continued)

FOREIGN PATENT DOCUMENTS

| | | |
|---|---|---|
| CN | 101621164 A | 1/2010 |
| GB | 2350731 A | 12/2000 |

(Continued)

OTHER PUBLICATIONS

Jun. 24, 2013—(EP) International Search Report—Int'l App—PCT/JP2013/058461.

(Continued)

*Primary Examiner* — Hung V Ngo
(74) *Attorney, Agent, or Firm* — Banner & Witcoff, Ltd.

(57) ABSTRACT

An electric wire drawout part structure so that the cover can be easily unlocked and the pipe body can be positioned without using a jig is provided. An electric wire drawout part structure including a housing, a cover which covers an opening part of the housing except an electric wire drawout part, electric wires which are drawn out from the electric wire drawout part, and a pipe body which accommodates and protects the electric wires, wherein, the cover is provided with an unlocking and positioning part for unlocking the cover from the housing and positioning the pipe body.

6 Claims, 5 Drawing Sheets

(56) References Cited

U.S. PATENT DOCUMENTS

| | | | |
|---|---|---|---|
| 5,718,604 A | 2/1998 | Conorich et al. | |
| 6,371,795 B1 | 4/2002 | Yamamoto et al. | |
| 2002/0009932 A1 | 1/2002 | Inaba et al. | |

FOREIGN PATENT DOCUMENTS

| | | | |
|---|---|---|---|
| GB | 2461372 A | 1/2010 |
| JP | H07-245140 A | 9/1995 |
| JP | 2001052531 A | 2/2001 |
| JP | 2010-010076 A | 1/2010 |
| WO | 2009/043862 A1 | 4/2009 |

OTHER PUBLICATIONS

Jun. 24, 2013—(EP) Written Opinion—Int'l App—PCT/2013/058461.
Jul. 7, 2015—(JP) Notification of Reasons for Refusal—App 2012-063043, Eng Tran.
Dec. 2, 2015—(CN) Notification of the First Office Action—App 201380015425.3.

* cited by examiner

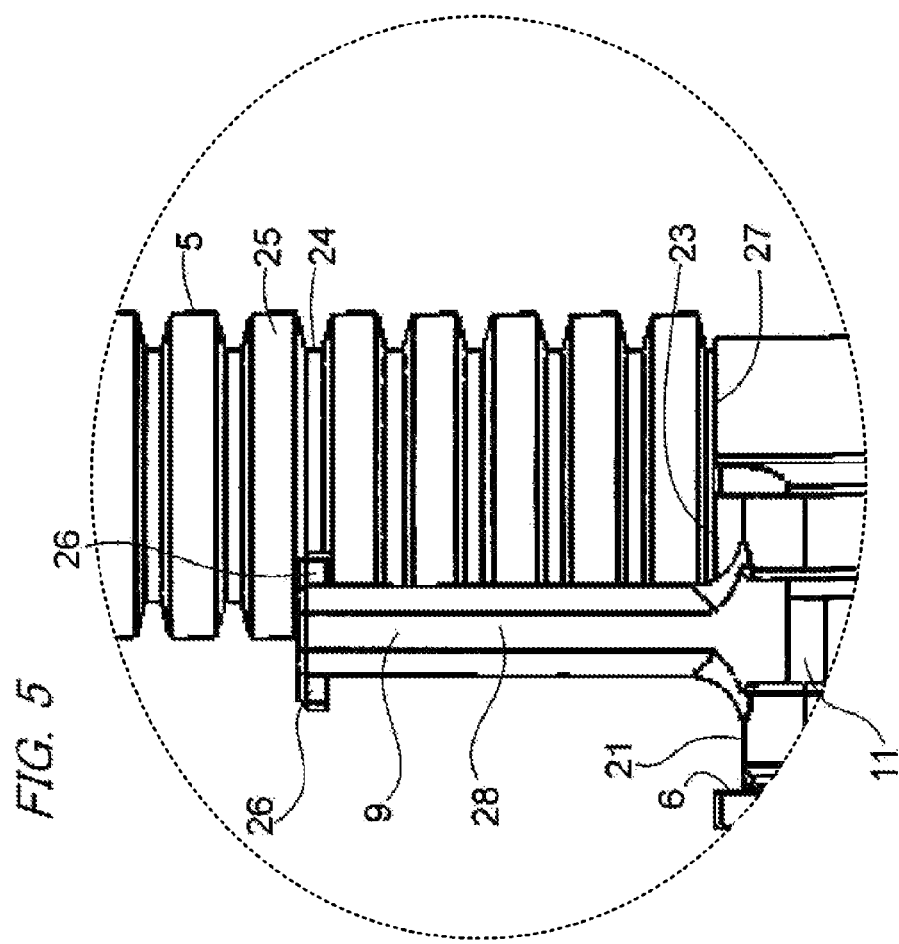
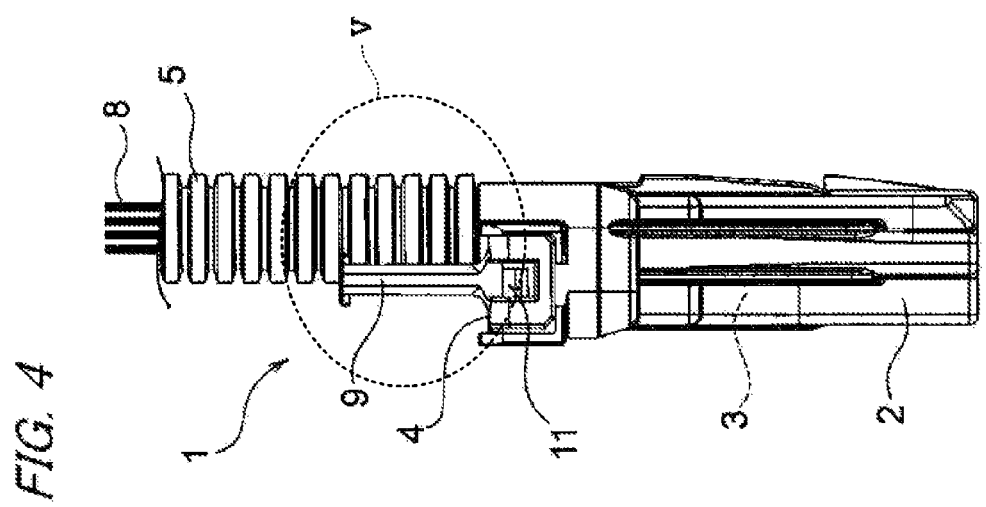

ELECTRIC WIRE DRAWOUT PART STRUCTURE

CROSS REFERENCE TO RELATED APPLICATIONS

This application is a continuation of PCT application No. PCT/JP2013/058461, which was filed on Mar. 15, 2013 based on Japanese Patent Application (No. 2012-063043) filed on Mar. 21, 2012, the contents of which are incorporated herein by reference.

BACKGROUND OF THE INVENTION

1. Field of the Invention

The present invention relates to an electric wire drawout part structure.

2. Description of the Related Art

A housing and a cover (rear holder) are disclosed in FIGS. 1 and 2 of the following patent literature 1, and electric wires not shown in the figure are drawn out from an opening part at the rear end of the housing. The cover is locked to the opening part of the housing. The cover has an electric wire drawout part, a locking projection, and an unlocking hole. The cover is locked when the locking projection of the cover is caught into a locking recess which is formed at the opening part of the housing. The cover functions as a so-called rear holder.

When it is required to detach the cover, for example, for maintenance, a jig for unlocking is inserted into the unlocking hole of the cover. Then, if a force is applied to the rear holder from the jig in the principle of leverage, the locking projection and the locking recess can be unlocked, and thus the cover is detached.

CITATION LIST

Patent Literature

[PTL 1] Japanese Patent Publication No. H07-245140

SUMMARY OF THE INVENTION

In the above related technique, because the cover cannot be detached without the jig for unlocking, there are problems that it is difficult to unlock the cover and it takes efforts to safe-keep the jig.

To protect the electric wires drawn out from the electric wire drawout part of the cover, it is considered to attach a pipe body for protecting the electric wires, but there is a problem that a gap occurs in wiring when the pipe body is not positioned. If a jig exclusively for preventing the position gap is prepared, there is a problem similar to that mentioned above. If the jig is not used, there is a problem that it is necessary to confirm that a sample article may be aligned, which makes the operation complicated.

The present invention is made in view of the above situations, and the object of the present invention is to provide an electric wire drawout part structure so that the cover can be easily unlocked and the pipe body can be positioned without using a jig.

In order to achieve the object described above, an electric wire drawout part structure according to the invention is characterized by the following (1) to (5).

(1) An electric wire drawout part structure comprising:
a housing,
a cover adapted to cover an opening part of the housing except an electric wire drawout part,
electric wires which are drawn out from the electric wire drawout part,
and a pipe body which is adapted to accommodate and protect the electric wires, wherein,
the cover is provided with an unlocking and positioning part for unlocking the cover from the housing and for positioning the pipe body.

According to the present invention having such a feature, the unlocking and positioning part of the cover becomes a part related to the unlocking from the housing. Further, the unlocking and positioning part of the cover becomes a part related to the positioning of the pipe body.

(2) The electric wire drawout part structure according to the above (1), wherein
the unlocking and positioning part is located near locking portions of the housing and the cover.

According to the present invention having such a feature, the unlocking and positioning part is arranged so that it is effective to unlock the cover from the housing.

(3) The electric wire drawout part structure according to the above (1) or (2), wherein
the pipe body has circular concave parts and/or circular convex parts, and the unlocking and positioning part has a pipe body engaging part which is engaged with the concave parts and/or the convex parts.

According to the present invention having such a feature, the unlocking and positioning part has a part which is effective for positioning the pipe body.

(4) The electric wire drawout part structure according to any one of the above (1) to (3), wherein
the unlocking and positioning part has a tape winding part for winding a tape to the pipe body.

According to the present invention having such a feature, the unlocking and positioning part has a part which is effective for positioning the pipe body.

(5) The electric wire drawout part structure according to any one of the above (1) to (4), wherein
the cover has a pressing part near the successive part of the unlocking and positioning part which is pressed against the pipe body.

According to the present invention having such a feature, the cover has a part which is effective for positioning the pipe body.

According to the present invention described in the above (1), because the cover is provided with the unlocking and positioning part, the cover can be unlocked from the housing and the pipe body can be positioned with the unlocking and positioning part. Therefore, according to the present invention, effects are achieved that the cover can be unlocked and the pipe body can be positioned without using a jig.

According to the present invention described in the above (2), because the unlocking and positioning part is arranged near the locking portions of the housing and the cover, particularly, an effect is achieved that the cover can be smoothly unlocked from the housing.

According to the present invention described in the above (3), because the unlocking and positioning part is provided with the pipe body engaging parts and the pipe body engaging part is engaged with the concave parts and/or the convex parts of the pipe body, an effect is achieved that the pipe body can be positioned more surely.

According to the present invention described in the above (4), because the unlocking and positioning part is provided with the tape winding part so that the pipe body is fixed to the tape winding part by the tape winding, an effect is achieved that the pipe body can be positioned more surely.

According to the present invention described in the above (5), because the cover is provided with the pressing part so that the unlocking and positioning part is used while the end of the pipe body is pressed to the pressing part, an effect is achieved that the pipe body can be positioned more surely.

BRIEF DESCRIPTION OF THE DRAWINGS

FIG. 4 is a side view of the LED unit.

FIG. 5 is an enlarged view of FIG. 4 showing the unlocking and positioning part.

DETAILED DESCRIPTION OF THE EXEMPLARY EMBODIMENTS

An electric wire drawout part structure includes a housing, electric wires which are drawn out from the housing, and a cover which covers an opening part of the housing except an electric wire drawout part, and the cover is provided with an unlocking and positioning part. The unlocking and positioning part is used to unlock the cover from the housing and position a pipe body.

Embodiment

Figure 1:
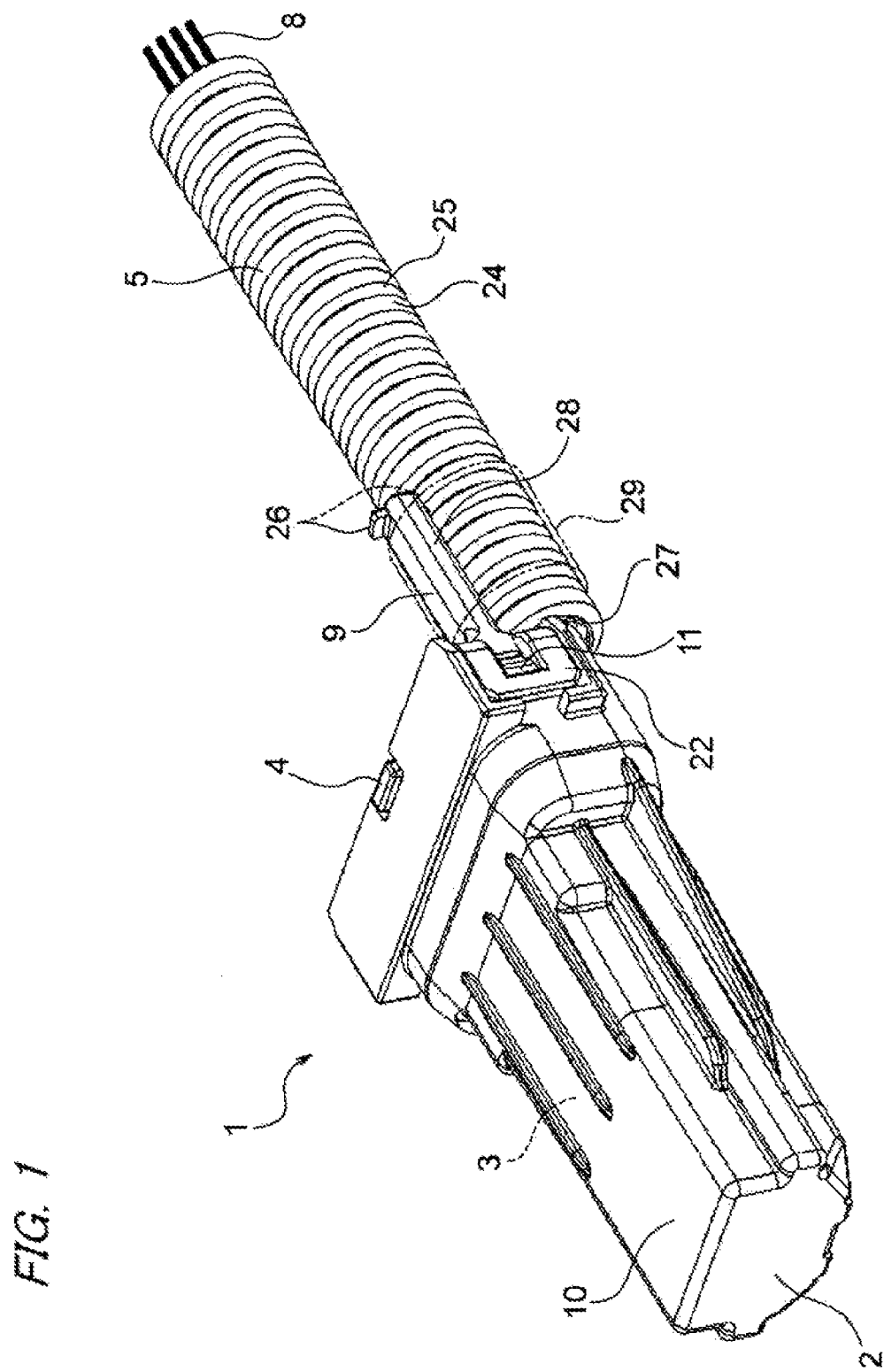
FIG. 1 is a perspective view of an LED unit in which an electric wire drawout part structure of the present invention is adopted.
Figure 2:
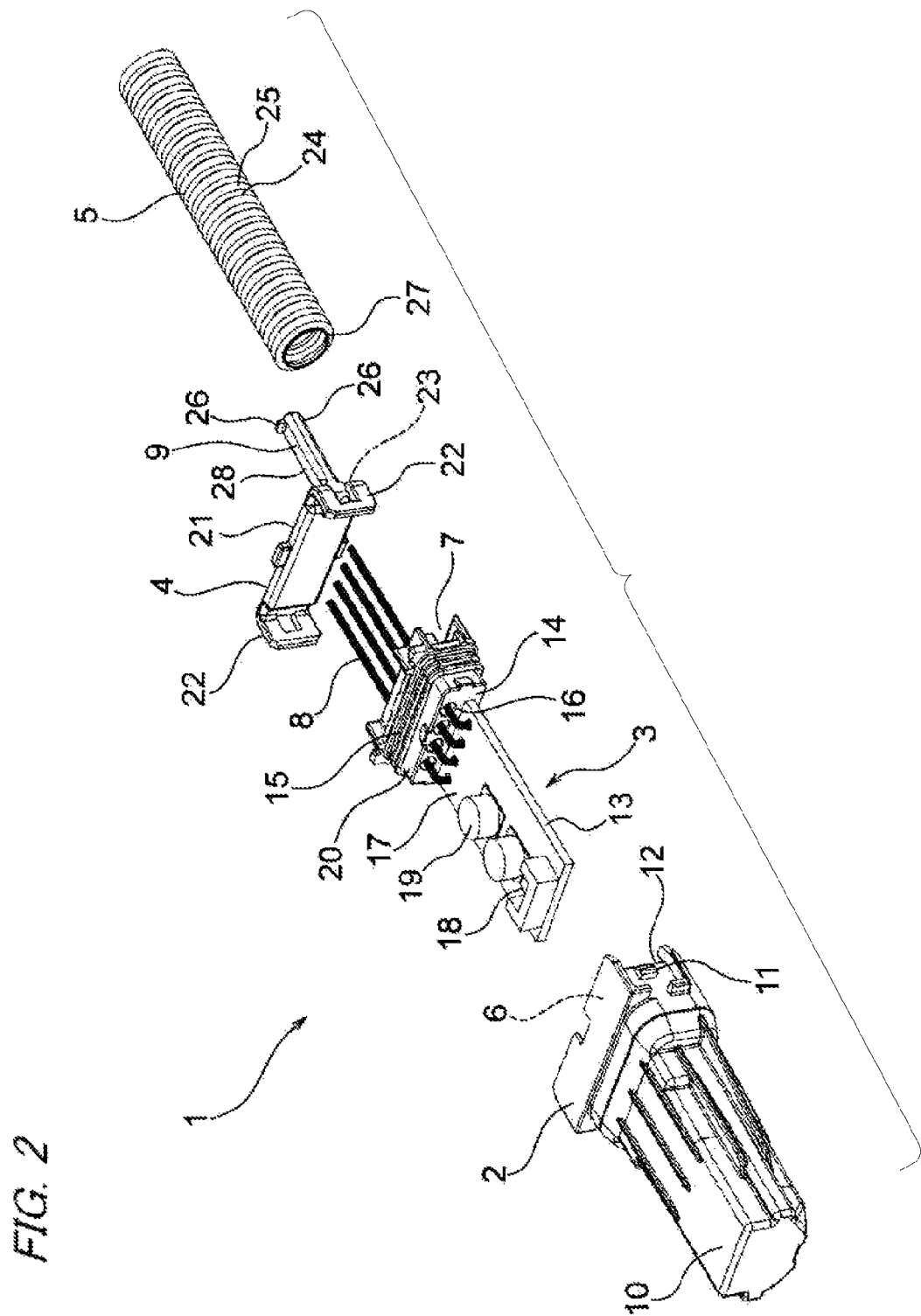
FIG. 2 is an exploded perspective view of the LED unit.
Figure 3A:
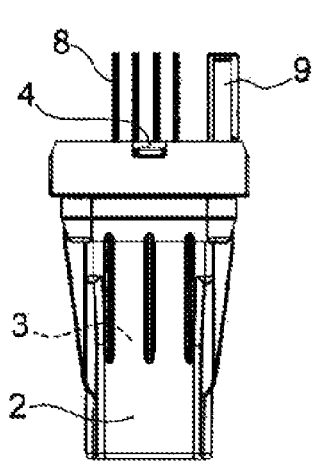
FIGS. 3A and 3B are figures showing electric wires are drawn out.
Figure 3B:
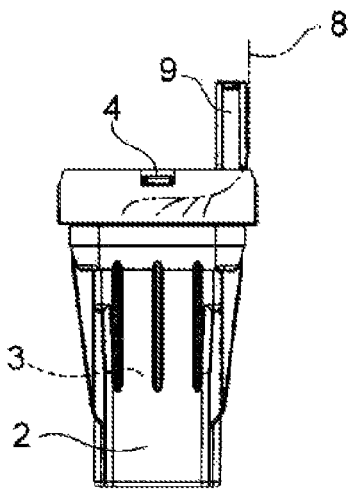
Figure 3C:
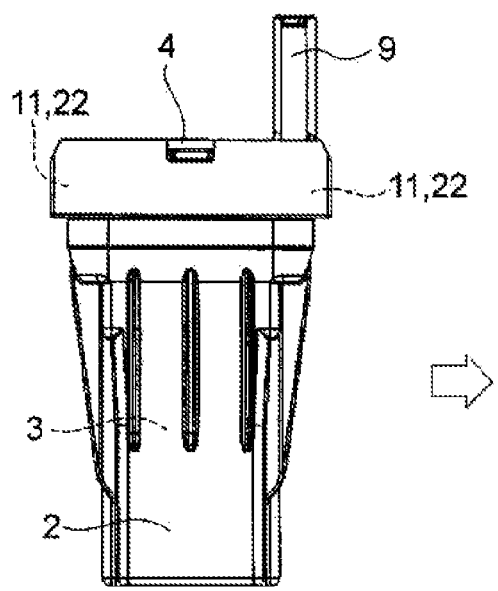
FIGS. 3C and 3D are figures showing a cover is unlocked.
Figure 3D:
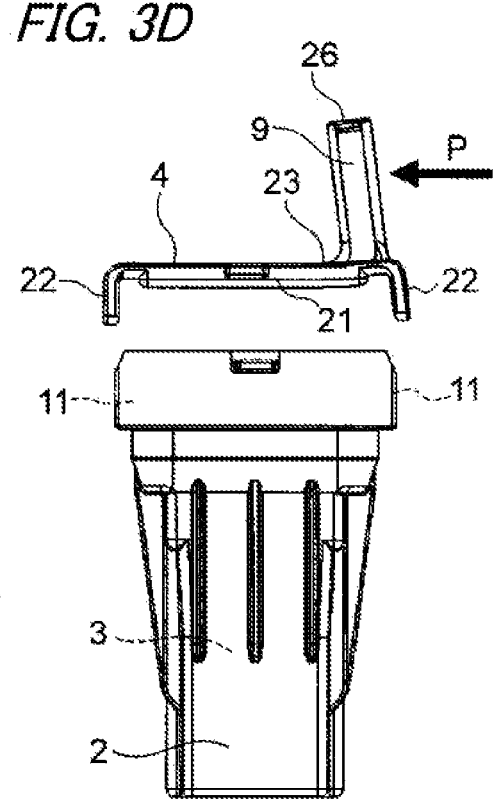
Figure 6:
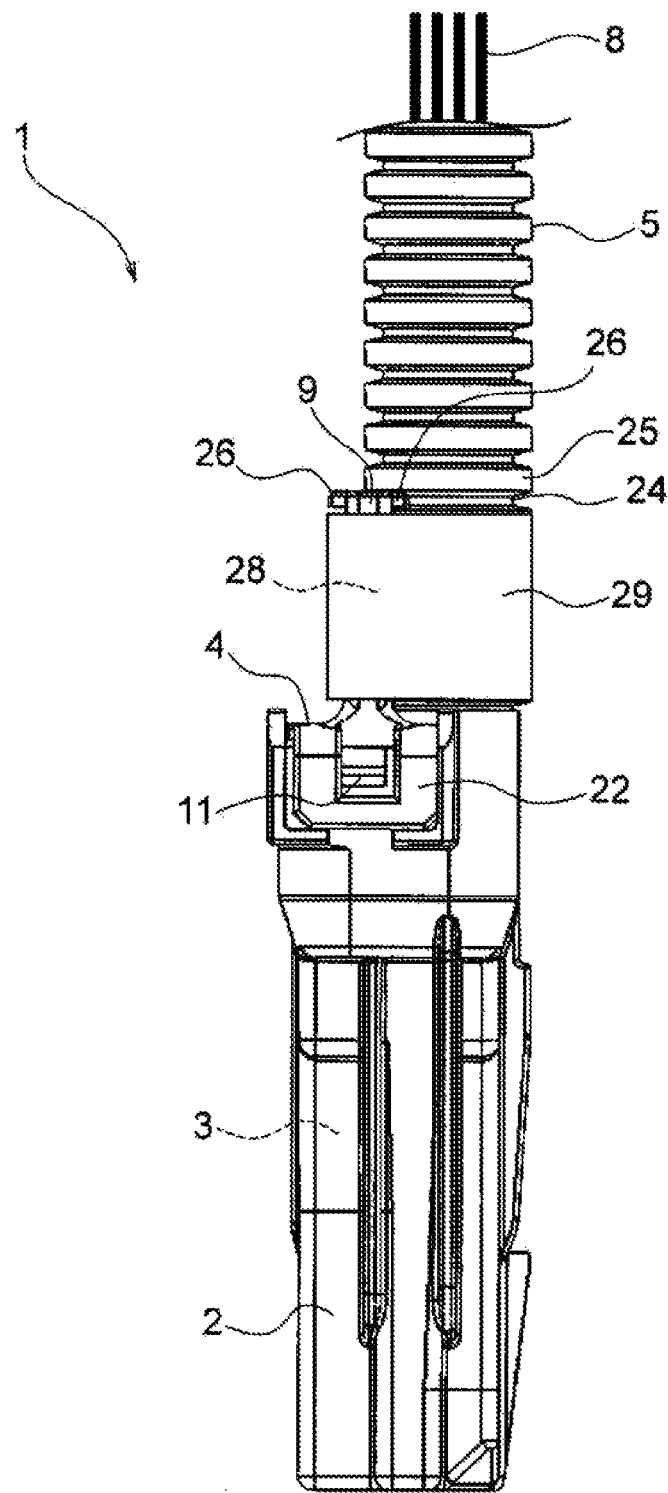
FIG. 6 is a side view of the LED unit onto which a tape winding is applied.

Below, an embodiment will be described with reference to the figures. FIG. 1 is a perspective view of an LED unit in which an electric wire drawout part structure of the present invention is adopted. FIG. 2 is an exploded perspective view of the LED unit. FIGS. 3A and 3B are figures showing electric wires are drawn out, and FIGS. 3C and 3D are figures showing a cover is unlocked. FIG. 4 is a side view of the LED unit and FIG. 5 is an enlarged view of a portion encircled by a dashed line V in FIG. 4, and showing the unlocking and positioning part. FIG. 6 is a side view of the LED unit to which a tape winding is applied.

In the following description, specific shapes, materials, numerical values, directions and the like are illustrated to facilitate the understanding of the present invention and may be changed appropriately in accordance with applications, objects and specifications.

In the following description, the electric wire drawout part structure of the present invention is adopted in an LED unit, namely, an LED unit assembled in a movable object such as an automobile, but the present invention shall not be limited to this. That is, the electric wire drawout part structure may be adopted in a display device having a lighting unit or a light emitting display part which uses a light source (lamp or the like) except an LED. In addition, the electric wire drawout part structure may be adopted in a connector which performs electrical connection.

In FIG. 1, a reference numeral 1 shows an LED unit in which the electric wire drawout part structure of the present invention is adopted. The LED unit 1 is provided to illuminate, for example, an illumination object (not shown in the figure) in an indoor room of the automobile. The LED unit 1 may be assembled into an electric car or a hybrid car, and, in this case, may illuminate, for example, a power supply connector.

In FIGS. 1 and 2, the LED unit 1 includes a housing 2, a function part 3, a cover 4 and a pipe body 5. The function part 3 is accommodated inside the housing through an opening part 6 which opens at the rear of the housing 2. The opening part 6 is covered with the cover 4 except an electric wire drawout part 7. A plurality of electric wires 8, which are connected to the function part 3, are drawn out from the electric wire drawout part 7. The cover 4 is provided with an unlocking and positioning part 9 which is a main part of the electric wire drawout part structure of the present invention. Next, the above-mentioned components are described in detail.

The housing 2 is a resin molded article which is made by using synthetic resinous material that has optical transparency, the opening part 6 is formed to open at the rear of the housing 2 as described above, and an accommodating space (not shown in the figure) is formed inside the housing 2. The whole housing 2 is transparent, and is formed into, for example, a box shape as shown in the figure. A light transmission part 10 is formed in the upper wall of the housing 2. A part corresponding to the position of an LED 18 to be described below corresponds to the light transmission part 10. Locking projections 11 (locking parts) are formed at the rear parts of the right and left side walls of the housing 2, respectively. The locking projections 11 are formed as parts for locking the cover 4.

Concave engaging parts 12, which are engaged with base end portions of locking arms 22 (to be describe below) of the cover 4, are formed at the right and left edges of the opening part 6 at the rear of the housing 2. The concave engaging parts 12 are formed by cutting the rear parts of the right and left side walls of the housing 2 into a concave shape.

In FIG. 2, the function part 3 includes a circuit board assembly 13, a holder 14, a waterproof packing 15 and a plurality of waterproofing stoppers 16. The circuit board assembly 13 has a board 17 which has a desired circuit pattern, and the LED 18 and electronic components 19 mounted on the surface (top surface) of the board 17.

Two side parts of the board 17 are supported by supporting parts which are formed on the inner surfaces of the housing 2 and not shown in the figure. The rear of the board 17 is held within the holder 14. The plurality of electric wires 8 are connected to the board 17 by being soldered. The soldered connecting parts are set to be near the holder 14 in the embodiment. The plurality of electric wires 8 are provided for power supply use and for signal use.

The LED 18 has a light emitting part in a box-like package, and is connected to the above-described circuit pattern of the board 17. The LED 18 emits light to illuminate an illumination object which is not shown in the figure. The arrangement of the LED 18 in the figure is just one example. The number of the LED 18 is not limited to one, but shall be arbitrary.

The holder 14 is a resin molded article which is made by using synthetic resin material, and has a holder body 20. The holder body 20 is formed so that the circumference of the holder body 20 is slightly smaller than the internal circumference of the housing 2, and a gap occurs. The gap is filled by the waterproof packing 15 in a water tight way.

The holder body 20 is formed with a board holding part (reference numeral omitted), a packing attaching part (reference numeral omitted) and a plurality of electric wire through holes (reference numeral omitted). The board holding part is formed as a part for holding the rear of the board 17.

The packing attaching part is a part to which the waterproof packing 15 is attached, and corresponds to the circumference of the holder body 20. The circumference of the holder body 20 or a packing attaching part 23 and the internal circumference of the housing 2 are formed as sealing surfaces to which the waterproof packing 15 adheres. The waterproof packing 15 is molded into an annular shape by using watertight material such as rubber. The waterproof packing 15 has elasticity. A plurality of lip parts are formed on the waterproof packing 15.

The electric wire through holes are parts to which the electric wires 8, to which the waterproof stoppers 16 are attached beforehand, are inserted, and are formed by being penetrated into a circular shape. The internal surfaces of the electric wire through holes are formed as sealing surfaces to which the waterproof stoppers 16 adhere. The waterproof stoppers 16 are molded into a generally pipe-like shape by using watertight material such as the rubber. The waterproof stoppers 16 have elasticity. A plurality of lip parts are formed on the waterproof stopper 16.

The cover 4 is a resin molded article by using synthetic resin material, and has a cover body 21, a pair of locking arms 22 (locking parts) and the unlocking and positioning part 9. The cover 4 is a so-called rear holder. The cover body 21 is formed as a part which covers the opening part 6 except the electric wire drawout part 7. The unlocking and positioning part 9 is integrally formed on the outer surface of the cover body 21. A pressing part 23 (refer to FIG. 5) which is pressed against the pipe body 5 is formed near an integral part (successive part) of the unlocking and positioning part 9.

The pipe body 5 of the present embodiment is a well-known corrugated tube which alternately has circular concave parts 24 and circular convex parts 25 following each other (This is just an example. The pipe body 5 may be a flexible tube which has a concave part 24 or a convex part 25 only at a predetermined position). The pipe body 5 is included as a member for accommodating and protecting the electric wires 8 that are drawn out.

The locking arms 22 are formed to follow the right and left side parts of the cover body 21. The locking arms 22 are formed into a generally frame-like shape to be locked by being caught onto the locking projections 11 of the housing 2. The locking arms 22 have flexibility. The base end parts of the locking arms 22 are engaged by being inserted into the concave engaging parts 12 of the housing 2.

The unlocking and positioning part 9 is formed integrally with the cover body 21 as a part for unlocking the cover 4 from the housing 2 and positioning the pipe body 5. Specifically, the unlocking and positioning part 9 is formed integrally with the cover body 21 as a part for unlocking the locking state of the locking arms 22 and the locking projections 11 of the housing 2 without using an exclusive jig, and as a part for fixing to prevent a position gap of the pipe body 5 in which the electric wires 8 are accommodated. The unlocking and positioning part 9 is disposed near one of the locking arms 22. The unlocking and positioning part 9 is formed into a generally rod-like shape (The shape is just one example, and the unlocking and positioning part 9 may have, for example, a rib shape).

In FIGS. 3A and 3B, the electric wires 8, which are, for example, drawn out straightly from the housing 2, are raked up at the side of the unlocking and positioning part 9 as shown with virtual lines. Then, the electric wires 8 are accommodated and protected in the pipe body 5 (refer to FIG. 1) (This is just an example).

In FIGS. 3C and 3D, when a force in an arrow P direction is applied to the unlocking and positioning part 9, the cover body 21 slightly elastically deforms, and the locking arms 22 caught onto the locking projections 11 of the housing 2 deviate with this elastic deformation, so that the cover 4 is unlocked. It is easy to unlock at this time. The unlocking and positioning part 9 is just used as a part like an operating arm. It is effective to arrange the unlocking and positioning part 9 near one of the locking arms 22, because of the unlocking and the above-mentioned elastic deformation.

In FIGS. 4 and 5, a pair of pipe body engaging parts 26 is formed to be projected from the distal end of the unlocking and positioning part 9. The pair of pipe body engaging parts 26 is formed into a projection shape, and one of the pipe body engaging parts 26 gets into the concave part 24 of the pipe body 5 to be engaged. The shape and the number of the pipe body engaging parts 26 are not particularly limited, as long as the position gap can be regulated when the pipe body engaging part 26 is engaged with the pipe body 5. The other pipe body engaging part 26 which does not get into the concave part 24 is used for a tape winding 29 to be described below in the embodiment.

Because the pipe body 5 is sandwiched between the unlocking and positioning part 9 and the electric wires 8 that are drawn out to be held, and is engaged in this held state when the pipe body engaging part 26 gets into the concave part 24, and because there is the pressing part 23 near the integral part of the unlocking and positioning part 9 and an end 27 of the pipe body 5 abuts with the pressing part 23, the pipe body 5 is adapted to be positioned and/or held surely.

Even if the pipe body 5 is inserted into, for example, a hole, which is formed as an opening in a body panel not shown in the figure, and is temporarily caught into the hole, a gap will not occur. The protection function of the pipe body 5 is maintained.

In the embodiment, a tape winding part 28 is formed between the pipe body engaging part 26 and the base end part of the unlocking and positioning part 9 (integral part facing the outer surface of the cover body 21) for winding a tape to the pipe body 5 to form the tape winding 29. When the tape winding 29 is applied as shown in FIG. 6 by using the tape winding part 28, it is apparent that the pipe body 5 is fixed more surely (The tape winding 29 may be applied in accordance with the use environment of the LED unit 1).

The unlocking and positioning part 9 is formed with a length suitable for the tape winding 29. If the tape winding 29 is applied by using the unlocking and positioning part 9 as a reference, or using the pipe body engaging part 26 as a reference, the operability is improved.

As described above with reference to FIGS. 1 to 6, because the cover 4 is provided with the unlocking and positioning part 9, the cover 4 can be unlocked from the housing 2 and the pipe body 5 can be positioned with the unlocking and positioning part 9. Therefore, effects are achieved that the cover 4 can be unlocked and the pipe body 5 can be positioned without using a jig.

Because the unlocking and positioning part 9 is arranged near the locking portions of the housing 2 and the cover 4, namely, near the locking parts, particularly, an effect is achieved that the cover 4 can be smoothly unlocked from the housing 2.

Because the unlocking and positioning part 9 is provided with the pipe body engaging parts 26 and the pipe body engaging part 26 is engaged with the concave part 24 of the pipe body 5, an effect is achieved that the pipe body 5 can be positioned more surely.

Because the unlocking and positioning part 9 is provided with the tape winding part 28 so that the pipe body 5 is fixed to the tape winding part 28 by the tape winding 29, an effect is achieved that the pipe body 5 can be positioned more surely.

Because the cover 4 is provided with the pressing part 23 so that the unlocking and positioning part 9 is used while the end 27 of the pipe body 25 is pressed to the pressing part 23, an effect is achieved that the pipe body 5 can be positioned more surely. It is also possible to provide the pressing part 23 at the rear of the housing 2.

It is apparent that various modifications can be made to the invention without changing the purpose of the invention.

The present invention is useful for providing an electric wire drawout part structure so that the cover can be easily unlocked and the pipe body can be positioned without using a jig.

What is claimed is:

1. An electric wire drawout part structure comprising:
    a housing,
    a rear holder adapted to cover an opening part of the housing except an electric wire drawout part, and including a lock portion configured to be locked with the housing,
    electric wires which are drawn out from the electric wire drawout part, and
    a pipe body which is adapted to accommodate and protect the electric wires which are drawn out from the housing, and
    an operation arm, provided in the rear holder so as to be integral with the lock portion, and extending outward of the housing so as to be arm shaped, wherein,
       the rear holder is provided with an unlocking and positioning part for unlocking the rear holder from the housing and for positioning the pipe body,
       the unlocking and positioning part unlocks the rear holder from the housing by elastically deforming the operation arm, and
       the unlocking and position part positions the pipe body by a pipe body engaging portion which is provided in the operation arm and which is configured to be engaged with the pipe body at a position where the pipe body is positioned.

2. The electric wire drawout part structure according to claim 1, wherein the unlocking and positioning part is located near locking portions of the housing and the rear holder.

3. The electric wire drawout part structure according to claim 1, wherein the pipe body has circular concave parts and/or circular convex parts, and the unlocking and positioning part has a pipe body engaging part which is engaged with the concave parts and/or the convex parts.

4. The electric wire drawout part structure according to claim 1, wherein the unlocking and positioning part has a tape winding part for winding a tape to the pipe body.

5. The electric wire drawout part structure according to claim 1, wherein the rear holder has a pressing part near a successive part of the unlocking and positioning part which is pressed against the pipe body.

6. The electric wire drawout part structure according to claim 1, where the unlocking and positioning part connects a base end part of operation arm to the lock portion.

* * * * *